US012092275B2

(12) United States Patent
Zhong et al.

(10) Patent No.: US 12,092,275 B2
(45) Date of Patent: Sep. 17, 2024

(54) WATER RIPPLE LAMP

(71) Applicant: Shenzhen Andelian Technology Co., Ltd., Shenzhen (CN)

(72) Inventors: Shaohua Zhong, Shenzhen (CN); Xishan Pang, Shenzhen (CN)

(73) Assignee: SHENZHEN ANDELIAN TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 18/401,502

(22) Filed: Dec. 31, 2023

(65) Prior Publication Data

US 2024/0167653 A1 May 23, 2024

Related U.S. Application Data

(63) Continuation-in-part of application No. PCT/CN2023/132441, filed on Nov. 17, 2023.

(30) Foreign Application Priority Data

Nov. 18, 2022 (CN) ........................ 202223064852.6

(51) Int. Cl.
*F21S 10/00* (2006.01)
*F21V 14/02* (2006.01)
(Continued)

(52) U.S. Cl.
CPC ............ *F21S 10/007* (2013.01); *F21V 14/02* (2013.01); *F21V 14/06* (2013.01); *F21V 29/503* (2015.01);
(Continued)

(58) Field of Classification Search
CPC ........ F21S 10/007; F21V 14/02; F21V 14/06; F21V 29/503; F21V 29/70; F21Y 2103/10; F21Y 2107/40; F21Y 2115/10
See application file for complete search history.

(56) References Cited

U.S. PATENT DOCUMENTS 7,556,396 B2 * 7/2009 Kuo .......................... F21K 9/65
362/240
8,360,599 B2 * 1/2013 Ivey ........................ F21V 29/70
362/225
(Continued)

FOREIGN PATENT DOCUMENTS

CN 207262094 U 4/2018
CN 208090574 U 11/2018
(Continued)

OTHER PUBLICATIONS

International Search Report, International Application No. PCT/CN2023/132441, mailed Dec. 7, 2023 (18 pages).

*Primary Examiner* — Tsion Tumebo

(57) ABSTRACT water ripple lamp includes: a housing assembly, a first water ripple light-transmitting plate, a water ripple light-transmitting tube assembly and a limiting assembly. The housing assembly is configured to define at least one light outlet. The first water ripple light-transmitting plate is configured to cover the at least one light outlet. The water ripple light-transmitting tube assembly is arranged inside the housing assembly. The water ripple light-transmitting tube assembly is configured to be rotatable. The water ripple light-transmitting tube assembly includes: a water ripple light-transmitting tube and an outer ring fixed to the water ripple light-transmitting tube. The limiting assembly includes a retaining ring and a bearing structure. The bearing structure is fixed to the retaining ring. The bearing structure includes a bearing. The bearing abuts against the outer ring, and is rollable relative to the outer ring.

17 Claims, 9 Drawing Sheets

(51) Int. Cl.

| | |
|---|---|
| ***F21V 14/06*** | (2006.01) |
| ***F21V 29/503*** | (2015.01) |
| ***F21V 29/70*** | (2015.01) |
| ***F21Y 103/10*** | (2016.01) |
| ***F21Y 107/40*** | (2016.01) |
| ***F21Y 115/10*** | (2016.01) |

(52) U.S. Cl.

CPC ........... *F21V 29/70* (2015.01); *F21Y 2103/10* (2016.08); *F21Y 2107/40* (2016.08); *F21Y 2115/10* (2016.08)

(56) References Cited

U.S. PATENT DOCUMENTS

| | | | | |
|---|---|---|---|---|
| 11,543,091 | B1 * | 1/2023 | Lu | G09F 13/06 |
| 2010/0103659 | A1 * | 4/2010 | Chen | F21V 29/70 362/231 |
| 2012/0212953 | A1 * | 8/2012 | Bloom | H05B 45/52 362/223 |
| 2015/0124439 | A1 * | 5/2015 | Huang | F21V 29/89 362/218 |
| 2015/0247607 | A1 * | 9/2015 | Kawabata | F21K 9/278 362/217.1 |
| 2020/0315907 | A1 * | 10/2020 | Dijkstra | A61H 15/0092 |

FOREIGN PATENT DOCUMENTS

| | | | | |
|---|---|---|---|---|
| CN | 212565475 | U | | 2/2021 |
| CN | 214064792 | U | * | 8/2021 |
| CN | 215570244 | U | | 1/2022 |
| CN | 217004123 | U | | 7/2022 |
| CN | 218954693 | U | | 5/2023 |
| KR | 20130080617 | A | | 7/2013 |

* cited by examiner

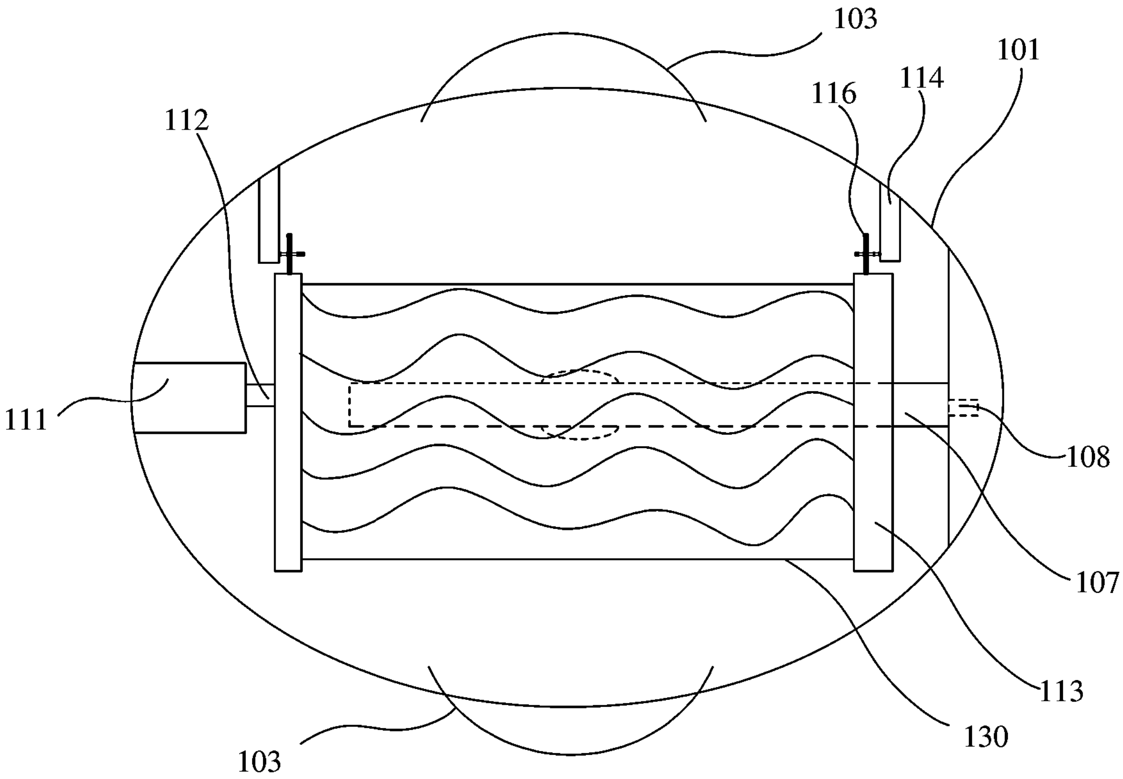
Fig.
14
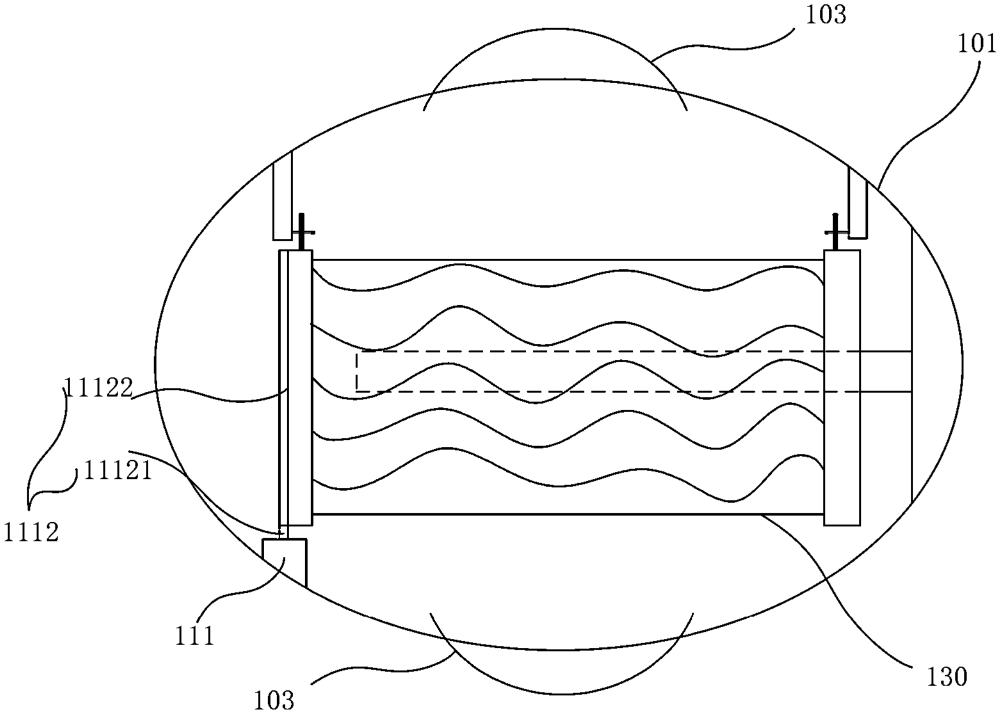
Fig. 15

WATER RIPPLE LAMP

CROSS REFERENCE TO RELATED APPLICATIONS

This application is a continuation in part of International Patent Application No. PCT/CN2023/132441, filed Nov. 17, 2023, which claims the priority of Chinese Patent Application No. 202223064852.6 filed Nov. 18, 2022, both of which are herein incorporated by reference in their entirety.

TECHNICAL FIELD

The present disclosure relates to the technical field of projecting lamps, and more particularly to a novel water ripple lamp.

BACKGROUND

A water ripple lamp is a type of projecting lamp developed according to an idea of projecting a water ripple effect. The light emitted by the water ripple lamp has a visual effect of flowing water. The light from a light source of the water ripple lamp passes through a water ripple plate or a water-ripple-patterned light-transmitting plate and then shines outward, a water ripple pattern on the water ripple plate will be projected out, thereby forming a light effect of water ripples. Water ripple lamps are widely applicable in the scenes of stages, building facades, bridges, roads, garden landscapes and other fields, featuring a powerful decorative function.

The structure design of water ripple lamps available on the market nowadays is cumbersome, outdated and unsound. The light source thereof is generally disposed at the bottom part of a housing, and a distance between the light source and the water-ripple-patterned light-transmitting plate is relatively long. As a result, the water ripple lamp will have a small light projection range and a narrow light projection plane, which would make it difficult to be applied to a variety of scenarios, and a versatility of the water ripple lamp would be poor. Furthermore, since the water ripple lamp available on the market is only provided with a single layer of fixed and immobile water-ripple-patterned light-transmitting plate, the water ripple effect irradiated by such a structure is very stiff and not lively. A dynamic effect of water ripples is absent, and a combining effect of static and dynamic water ripples doesn't appear, nor the effect of backflow. The visual effect is stiff, realistic, and the ornamental effect is poor.

Therefore, how to implement a novel water ripple lamp is a technical issue to be urgently solved in this industry.

SUMMARY OF THE DISCLOSURE

The main object of the present disclosure is to provide a novel water ripple lamp intended to overcome the relevant technical defects.

According to a first aspect of the present disclosure, a water ripple lamp includes: a housing assembly, a first water ripple light-transmitting plate, a water ripple light-transmitting tube assembly and a limiting assembly. The housing assembly is configured to define at least one light outlet. The first water ripple light-transmitting plate is configured to cover the at least one light outlet. The water ripple light-transmitting tube assembly is arranged inside the housing assembly. The water ripple light-transmitting tube assembly is configured to be rotatable. The water ripple light-transmitting tube assembly includes: a water ripple light-transmitting tube and an outer ring fixed to the water ripple light-transmitting tube. The limiting assembly includes a retaining ring and a bearing structure. The retaining ring is fixed to the housing assembly. The bearing structure is fixed to the retaining ring. The bearing structure includes a bearing. The bearing is configured to abut against the outer ring, and is rollable relative to the outer ring.

According to a second aspect of the present disclosure, a water ripple lamp includes: a housing assembly, a water ripple light-transmitting tube assembly and a light-emitting assembly. The water ripple light-transmitting tube assembly is arranged inside the housing assembly. The water ripple light-transmitting tube assembly is configured to be rotatable. The light-emitting assembly includes a heat dissipation column and at least one light source structure. The heat dissipation column includes a plurality of side faces. The heat dissipation column is fixedly connected to the housing assembly and at least partially extends into a cavity defined by the water ripple light-transmitting tube assembly. The at least one light source structure is tightly attached to one of the plurality of side faces.

A novel water ripple lamp is realized in the present disclosure. The water ripple lamp of the present disclosure has the following advantages: the structure of the water ripple lamp is scientifically and smartly designed, and is simple and reasonable; the water ripple lamp has a wide light-emitting range, and is highly versatile; the water-ripple lighting effect of the water ripple lamp owns a sense of gradation, combines dynamics and statics, and features a backflow effect; and the water ripple effect of the water ripple lamp is realistic, dynamic and agile, and is highly ornamental.

BRIEF DESCRIPTION OF THE DRAWINGS

FIG. 14 is a schematic diagram of a water ripple lamp according to an embodiment of the present disclosure.

FIG. 15 is a schematic diagram of a water ripple lamp according to an embodiment of the present disclosure.

Figure 1:
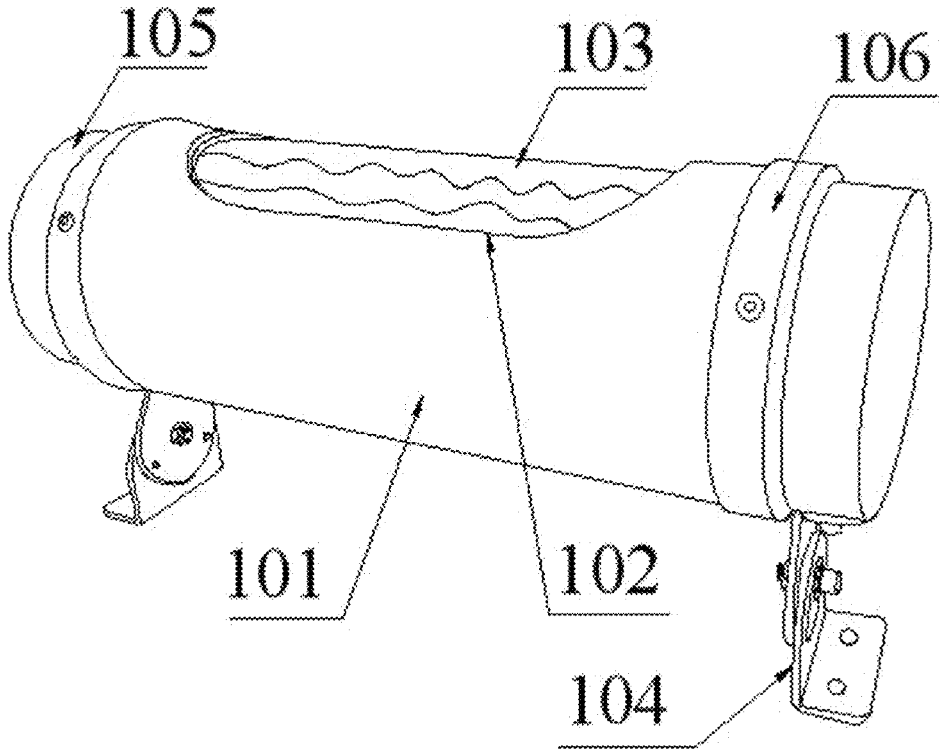
FIG. 1 is a first schematic three-dimensional structural diagram of a novel water ripple lamp according to an embodiment of the present disclosure.
Figure 2:
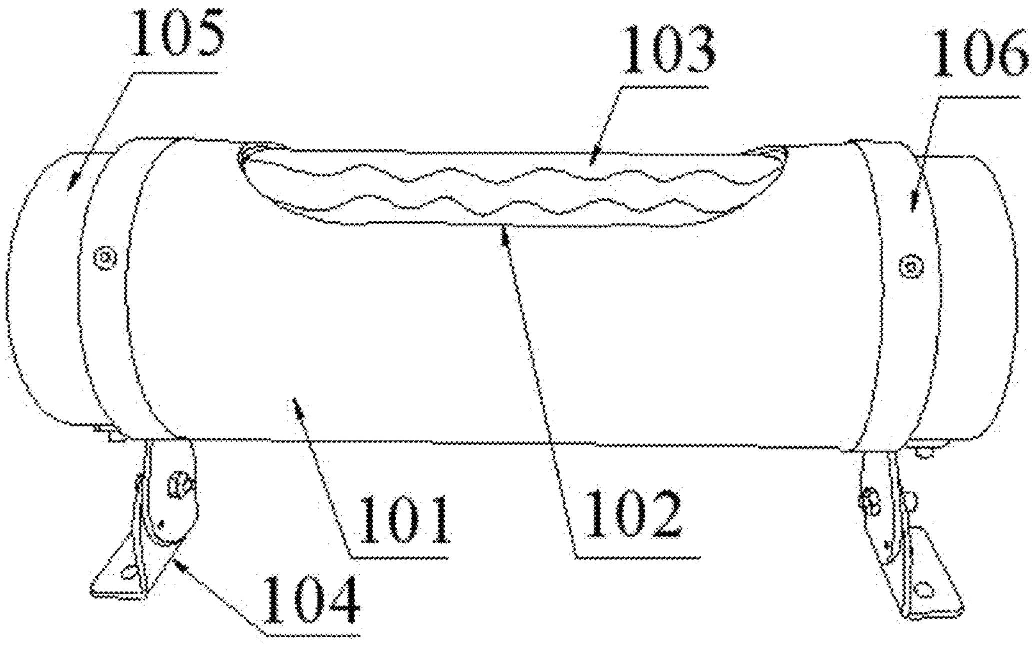
FIG. 2 is a second schematic three-dimensional structural diagram of a novel water ripple lamp according to an embodiment of the present disclosure.
Figure 3:
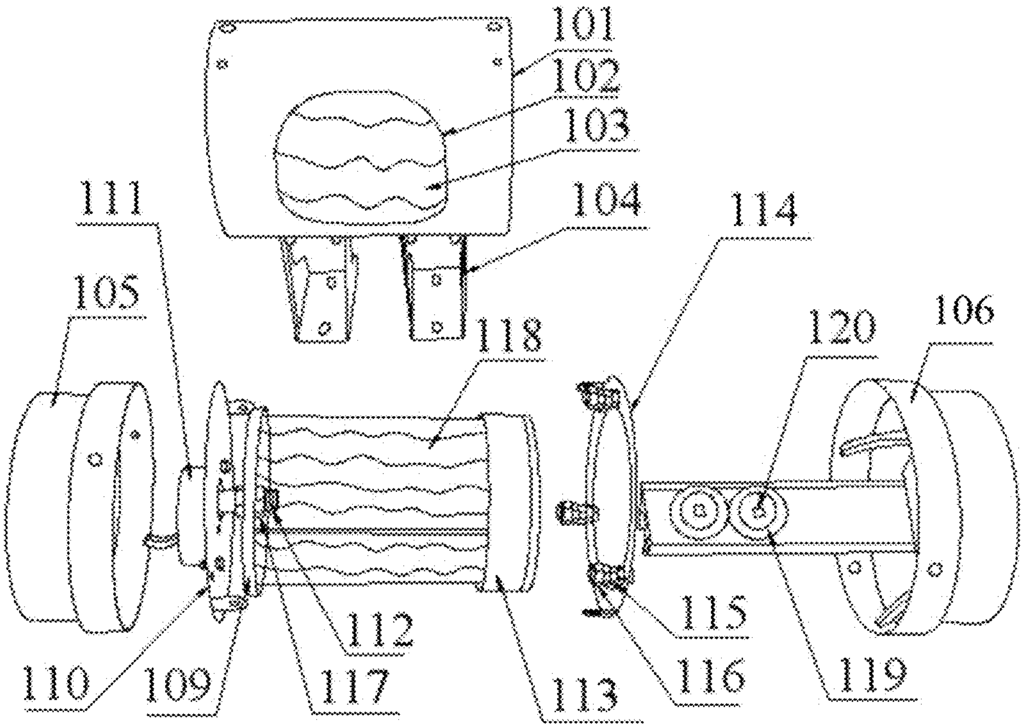
FIG. 3 is a first schematic exploded three-dimensional structural diagram of a novel water ripple lamp according to an embodiment of the present disclosure.
Figure 4:
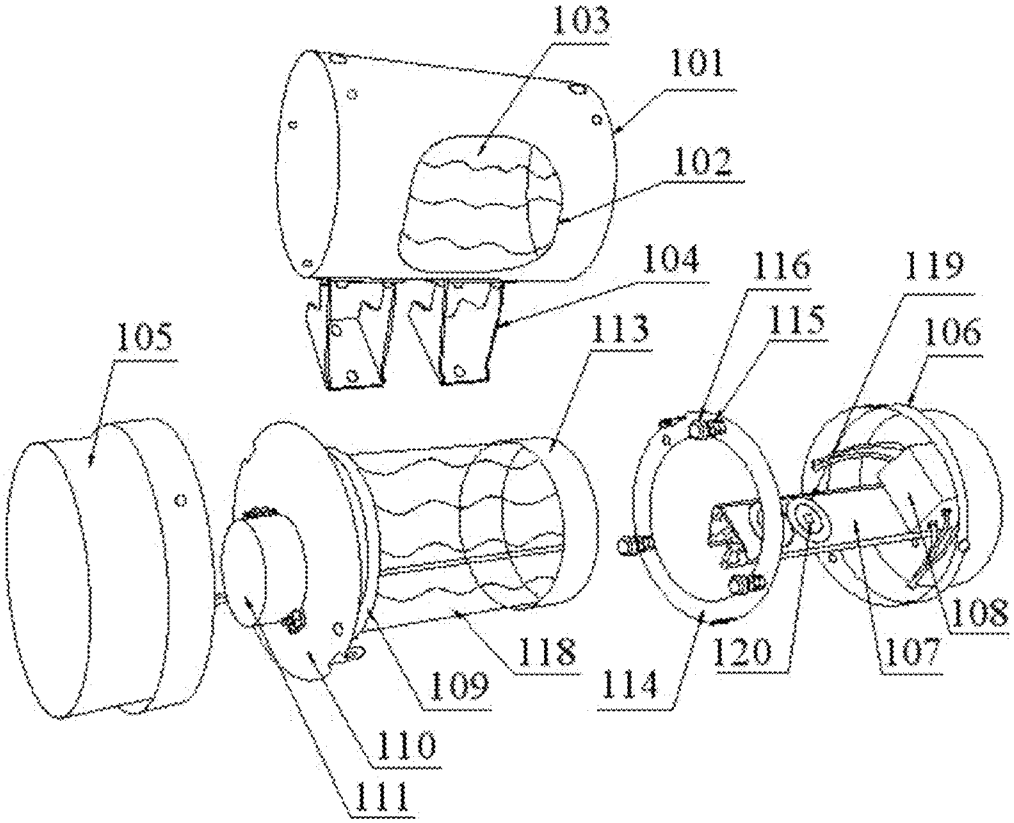
FIG. 4 is a second schematic exploded three-dimensional structural diagram of a novel water ripple lamp according to an embodiment of the present disclosure.
Figure 5:
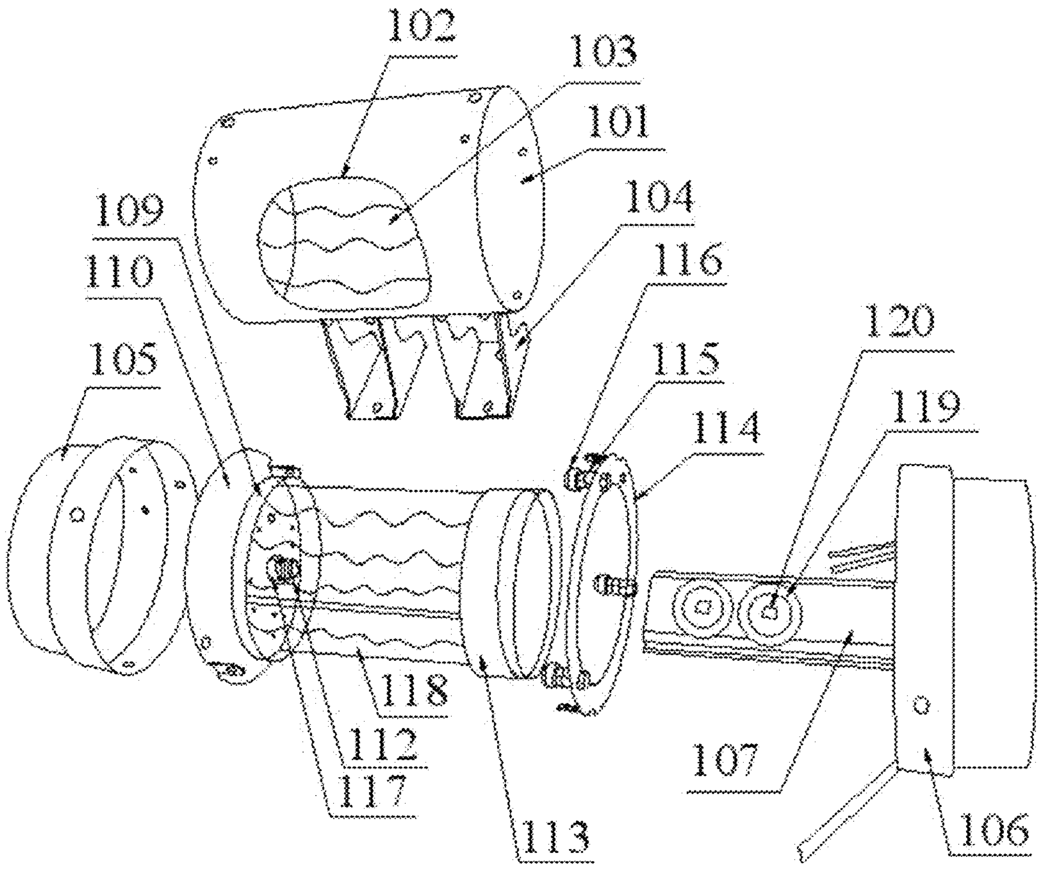
FIG. 5 is a third schematic exploded three-dimensional structural diagram of a novel water ripple lamp according to an embodiment of the present disclosure.
Figure 6:
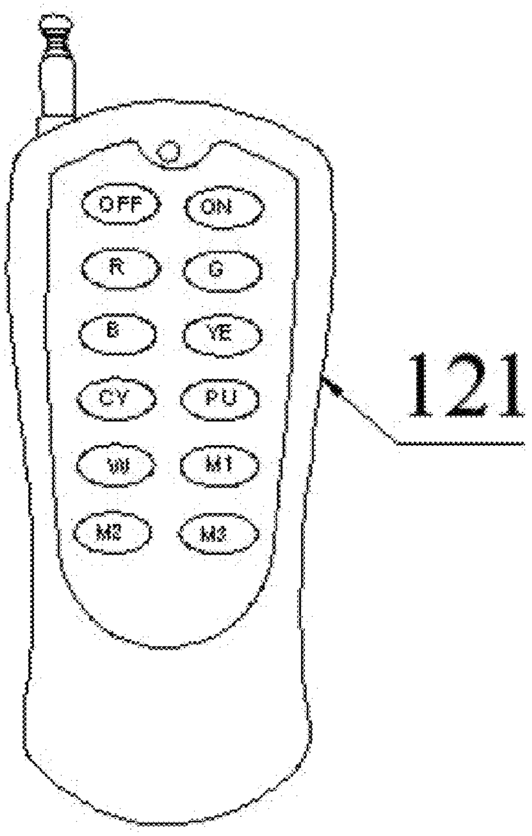
FIG. 6 is an enlarged schematic diagram of a remote control of a novel water ripple lamp according to an embodiment of the present disclosure.

The implementation of the objects, functional features and advantages of the present disclosure will be further described in conjunction with the embodiments and with reference to the accompanying drawings.

DETAILED DESCRIPTION

It should be appreciated that, the specific embodiments described herein are intended for explaining the present disclosure only, and are not intended to limit the present disclosure.

In the description of the embodiments of the present disclosure, it should be understood that, the terms "length", "width", "upper", "lower", "front", "rear", "left", "right", "horizontal", "vertical", "top", "bottom", "inner", "outer" and others indicate directional or positional relationships are based on the orientation or position relationship illustrated in the drawings, and are only for the convenience of describing the embodiments and simplification of the description, but do not indicate or imply that the apparatus or unit referred to must have a specific orientation, be constructed and operated in a specific orientation, therefore cannot be construed as a restriction on the embodiments.

In addition, the terms "first" and "second" are only for the purpose of description, and cannot be construed as indicating or implying relative importance or implicitly indicating the number of technical features referred to. Thus, the features preceded by "first" and "second" may explicitly or implicitly include one or more of these features. In the description of the present disclosure, "a plurality of" means two or more than two, unless otherwise specifically defined.

In embodiments of the present disclosure, unless otherwise definitely specified and limited, the terms "installed", "joined", "connected", "fixed" and other terms should be understood in a broad sense. For example, they can be fixed connections or detachable connections, or be integrally connected to form one piece. In some embodiments, they may be mechanical connections or electrical connections. In some embodiments, they may be direct connections or indirect connections through intermediate mediums, and they may be an internal communication or interaction relationship between two components. For those of ordinary skills in the art, the specific meanings of the above-mentioned terms in the embodiments of the present disclosure may be understood according to specific circumstances.

As illustrated in FIGS. 1 to 6, a novel water ripple lamp according to an embodiment of the present disclosure is provided. The water ripple lamp includes: a housing 101, which defines a light outlet 102 on its side face; a first water ripple light-transmitting plate 103, which is fixed to the light outlet 102 and in the shape of an arcuate surface; an adjustable bracket 104, which is mounted to a lower end of the housing 101, and a mounting angle of the adjustable bracket 104 is adjustable; a left side cover 105, which is mounted to a left end of the housing 101; a right side cover 106, which is mounted to a right side end of the housing 101; a water ripple light-transmitting tube structure, which is provided inside the housing 101; a heat dissipation column 107, which is fixedly disposed at an inner bottom of the right side cover 106, and extends into the water ripple light-transmitting tube structure; a number of LED light source structures, each of which is tightly attached or attached to the heat dissipation column 107; and a driver apparatus 108, which is disposed inside the right side cover 106, and electrically coupled with the LED light source structure.

The water ripple light-transmitting tube structure includes: a water ripple light-transmitting tube 130, which is cylindrical and is rotatable around the heat dissipation column 107; a base plate 109, which is fixed to a left end of the water ripple light-transmitting tube 130, and is integrated with the water ripple light-transmitting tube 130 into one single piece; a mounting plate 110, which is disposed on a left side of the base plate 109; a motor 111, which is mounted on the left side of the mounting plate 110; and a coupling shaft 112, which is connected to both the motor 111 and the base plate 109, provided between the motor 111 and the base plate 109, and serves as a linkage. A first hole is defined in the mounting plate 110 for the coupling shaft 112 to pass through. The motor 111, when operating, drives the coupling shaft 112, the base plate 109, and the water ripple light-transmitting tube 130 to rotate together. The mounting plate 110 is fixedly mounted to the left end of the housing 101. The water ripple light-transmitting tube structure further includes: an outer ring 113, which is fixedly mounted at the right side end of the water ripple light-transmitting tube 130; a retaining ring 114, which is fixedly mounted at the right side end of the housing 101; and a number of bearing structures 115, which are mounted on the retaining ring 114. Each of the bearing structures 115 is provided with a bearing 116. The bearing 116 is configured to abut against an outer side of the outer ring 113. Therefore, the bearing 116 serves as a stopper for the outer ring 113 or serves to limit the location of the outer ring 113, while at the same time serves to minimize friction. The outer ring 113, when rotating with the water ripple light-transmitting tube 130, brings the bearings 116 to rotate or roll in synchronization. A second hole is defined in the base plate 109 for the coupling shaft 112 to pass through. The coupling shaft 112 is provided with threads. After the coupling shaft 112 passes through the first hole and the second hole, the coupling shaft 112 is fixedly connected to the base plate 109 by means of a nut 117.

The bearing 116 of the bearing structure 115 abuts against the outer side of the outer ring 113, thereby serving as a stopper for the outer ring 113, such that no dislocation of the outer ring 113 occurs, thus no dislocation or vibration of the water ripple light-transmitting tube 130 would occur. As a result, the water ripple images projected are clear and realistic, no artifact would be formed, and the stability of the emitted light is great, such that the stability of the water ripple light effect would be guaranteed. The bearing 116 also serves to reduce the friction, effectively protect the motor 111, and prolong a service life of the motor 111.

The first water ripple light-transmitting plate 103 and the rotatable water ripple light-transmitting tube 130 together form a double-layer water ripple light-transmitting structure that combines static and dynamics parts. The LED light source structure is positioned in the middle of the water ripple light-transmitting tube 130. The light emitted from the LED light source structure would pass through the double-layer water ripple light-transmitting structure, and then emit outward, thereby creating a dynamic water ripple lighting effect. The dynamic water ripple lighting effect owns a sense of gradation, combines dynamics and statics, and features a backflow effect. The water ripple effect is thus realistic and agile, and is highly ornamental.

With respect to the existing water ripple lamp available on the market, the light source is generally disposed at the bottom of the housing of the water ripple lamp, i.e. below the water ripple light-transmitting plate. There is only a single layer of fixed and immobile water ripple light-transmitting plate, the distance between the light source and the water ripple light-transmitting plate is long. As a result, the water ripple lamp will have a small light projection range and a narrow light projection plane, which would make it difficult to be applied to a variety of scenarios, and the versatility of the water ripple lamp would be poor.

In contrast, in the present disclosure, the light source of the water ripple lamp is positioned inside the water ripple light-transmitting tube 130. Moreover, the double-layer water ripple light-transmitting structure formed by the first water ripple light-transmitting plate 103 and the rotatable water ripple light-transmitting tube 130 is provided. In this way, the distance between the light source and the water ripple light-transmitting tube 130 is relatively short, which makes the water ripple lamp has a wide light-emitting range and a wide light-emitting plane. In addition, due to the provision of the double-layer water ripple light-transmitting structure, the light emitted from the light source undergoes secondary refraction, the divergent effect of the emitted light is improved, the radiation range is broader, and the light-emitting plane is wider. According to a test of the applicant, when the volume the housing 101 is constant, the light-emitting range of the water ripple lamp of the present disclosure may be about 3 times as great as that of the existing water ripple lamp available on the market. The light divergence performance of the water ripple lamp of the present disclosure is good, the light-emitting range is broad, and the light-emitting plane is wide. The water ripple lamp may be applied to a variety of scenes, and is thus highly versatile.

Furthermore, since the water ripple lamp available on the market is only provided with a single layer of fixed and immobile water ripple light-transmitting plate, the water ripple effect irradiated by such a structure is very stiff and not lively, dynamic effect of water ripples is absent, and the combining effect of static and dynamic water ripples doesn't appear, nor the effect of backflow. The visual effect is stiff, unrealistic, and the ornamental effect is poor.

In contrast, the structure of the water ripple lamp of the present disclosure is scientifically and smartly designed, and is simple and reasonable. The light emitted from the LED light source structure would pass through the double-layer water ripple light-transmitting structure, and then emit outward, thereby creating a dynamic water ripple lighting effect. The dynamic water ripple lighting effect owns a sense of gradation, combines dynamics and statics, and features a backflow effect. The water ripple effect is realistic and agile, and is highly ornamental.

The water ripple light-transmitting tube 130 is a one-piece structure, or is composed of a number of arc-shaped second water ripple light-transmitting plate 118 that are spliced or connected together. The specific structural form of the water ripple light-transmitting tube 130 may be determined according to actual needs. In the present embodiment, a spliced structure is adopted, wherein the water ripple light-transmitting tube 130 is spliced by 4 second water ripple light-transmitting plates 118 in the shape of arcuate surface.

One or more of the first water ripple light-transmitting plate 103, the second water ripple light-transmitting plate 118, and the integrally formed water ripple light-transmitting tube 130 may be made of various light-transmitting materials, such as glass or plastic, etc.

The LED light source structure includes a substrate 119 tightly attached or attached to the heat dissipation column 107, and a plurality of RGB lamp beads 120 disposed on the substrate 119. The driver apparatus 108 may adjust the color temperatures, colors, and brightness of the RGB lamp beads 120, such that the RGB lamp beads 120 may emit monochromatic light or a variety of mixed-color light. In this way, the color of the emitted light is comprehensive, the emitted light effect is plentiful and colorful, and the full color gamut of the emitted light is realized. The RGB lamp bead 120 may be replaced by other types of LED lamp beads, such as RGB-W lamp beads etc., which is not limited in the present disclosure.

In addition, the heat dissipation column 107 is welded to the inner bottom of the right side cover 106, and forms a one-piece structure with the right side cover 106. The left side cover 105, the housing 101, and the right side cover 106 are tightly joined after assembly, and form an integrated heat dissipation structure. In this way, the heat generated by the LED light source may be promptly transferred to the heat dissipation column 107 and may spread across the left side cover 105, the housing 101, and the right side cover 106. Therefore, the heat dissipation efficiency may be greatly enhanced, and the heat generated by the LED light source may be promptly and rapidly transferred away. The heat dissipation of the water ripple lamp is highly efficient, and the heat dissipation effect is ideal.

The water ripple lamp further includes a controller. The controller is configured to be electrically coupled to the motor 111 and the driver apparatus 108.

The water ripple lamp further includes a remote control 121. The remote control 121 may be configured to remotely control the operation of the motor 111 and/or the driver apparatus 108.

In other words, the water ripple lamp may be regulated by the controller or the remote control 121.

The water ripple lamp may be optionally powered by direct-plugged-type supply from the utility power grid or by a battery supplied by a solar photovoltaic panel.

In addition, the adjustable bracket 104 may be fixedly mounted on the floor, the wall, or other locations. With the adjustable bracket 104, the irradiating angle of the water ripple lamp may also be conveniently adjusted, so as to choose a suitable projection position.

The present disclosure provides a novel water ripple lamp. The water ripple lamp has the following advantages: the structure of the water ripple lamp is scientifically and smartly designed, simple and reasonable; the water ripple lamp has a broad light-emitting range, and is highly versatile; the water ripple lighting effect of the water ripple lamp owns a sense of gradation, combines dynamics and statics, and features a backflow effect; the water ripple effect of the water ripple lamp is realistic and agile, and is highly ornamental. The water ripple lamp is further provided with a bearing structure 115, which serves as a stopper and reduces fictional effects. In this way, the water ripple images are clear and realistic, no artifact would be formed, and the stability of the emitted light is great. The bearing also serves to reduce the frictional effects, and effectively protect the motor 111.

Other alternative embodiments of the present disclosure are illustrated below. The features of various embodiments of the present disclosure may be combined with each other to form new embodiments, provided that the features do not conflict with each other.

Embodiment 1

As illustrated in FIGS. 1-6, the water ripple lamp includes: a housing assembly; a water ripple light-transmitting plate 103 connected to the housing assembly; a water-ripple-patterned light-transmitting tube assembly or water ripple light-transmitting tube assembly arranged inside the housing assembly; and a power assembly configured to drive the water ripple light-transmitting tube assembly to rotate. The first water ripple light-transmitting plate 103 may also be referred to as a first water-ripple-pattern light-transmitting plate.

The housing assembly includes a housing 101, a left side cover 105 and a right side cover 106. The left side cover 105 is mounted at the left end of the housing 101. The right side cover 106 is mounted at the right end of the housing 101. As illustrated in FIGS. 1-6, the housing 101 may have a columnar shape, such as a circular column, i.e., a cylinder. The left side cover 105 is mounted to an end of the column, and the right side cover 106 is mounted to the other end of the column. The column, the right side cover 105 and the left side cover 106 collectively define an internal cavity, for accommodating or housing various components of the water ripple lamp.

The housing 101 defines a light outlet 102 on a surface thereof. The light outlet 102 is, for example, a through slot penetrating the wall of the housing 101. The light outlet 102 may be, for example, in the shape of a rectangular. A first water ripple light-transmitting plate 103 is fixed to the housing 101. The first water ripple light-transmitting plate 103 may cover the light outlet 102 in various manners. For example, a peripheral edge of the first water ripple light-transmitting plate 103 may be fixed to an inner wall of the light outlet 102, or the first water ripple light-transmitting plate 103 may be fixed to an inner surface or an outer surface of the housing 101 and cover the entire light outlet 102. The specific manner is not limited in the present disclosure. The water ripple light-transmitting plate 103, also referred to as a water-ripple sheet, is made from a light-transmitting material such as glass, plastic, or the like. Water-ripple pattern is formed on the surface of the water-ripple sheet. The water-ripple pattern is represented, for example, by a variation of concavity and convexity, a variation of thickness, a variation of light transmittance, and/or the like, across the surface of the water-ripple sheet. As illustrated in FIG. 1, the first water ripple light-transmitting plate 103 may be an arch-shaped water-ripple sheet. In some embodiments, the first water ripple light-transmitting plate 103 may be a rectangular water-ripple sheet. After being fixed to the housing 101, the first water ripple light-transmitting plate 103 is configured to be bent into an arch shape.

The water ripple light-transmitting tube assembly includes: a water ripple light-transmitting tube 130, a base plate 109, and an outer ring 113. The base plate 109 is fixed to one end of the water ripple light-transmitting tube 130, and the outer ring 113 is fixed to another end of the water ripple light-transmitting tube 130. The water ripple light-transmitting tube 130 may also be referred to as a water-ripple-patterned light-transmitting tube. The water ripple light-transmitting tube 130 has a cylindrical shape. The water ripple light-transmitting tube 130 is a one-piece structure, or composed of a number of arc-shaped second water ripple light-transmitting plate 118 that are spliced or connected together. The structural form of the water ripple light-transmitting tube 130 may be determined according to actual needs. In the present embodiment, a spliced structure is adopted, the water ripple light-transmitting tube 130 is spliced by 4 or less or more second water ripple light-transmitting plates 118 with curved surfaces. Similar to the water ripple light-transmitting plate 103, the water ripple light-transmitting tube 130 or the second water ripple light-transmitting plate 118, also referred to as a water-ripple sheet, is made from a light-transmitting material such as glass, plastic, or the like. Water-ripple pattern is formed on the surface of the water-ripple sheet. The water-ripple pattern is represented, for example, by a variation of concavity and convexity, a variation of thickness, a variation of light transmittance, and the like, across the surface of the water-ripple sheet.

The base plate 109 is for example fixed to a left end of the water ripple light-transmitting tube 130, and forms an integral structure with the water ripple light-transmitting tube 130. The base plate 109 may provide structural support for the water ripple light-transmitting tube 130. The base plate 109 may also rotate when driven by the power assembly, thereby making the water ripple light-transmitting tube 130 to rotate.

The outer ring 113 is mounted and fixed at a right end of the water ripple light-transmitting tube 130. As illustrated in FIGS. 1-6, the outer ring 113 includes a column or column-shaped part, an end of the column is fixed to the water ripple light-transmitting tube 130. The outer ring 103 may also provide a structural support for the water ripple light-transmitting tube 130.

The power assembly includes: a mounting plate 110, a motor 111, and a coupling shaft 112. The motor 111 is mounted on the left side of the mounting plate 110. The coupling shaft 112 is connected between the motor 111 and the base plate 109, and serves a coupling function between the motor 111 and the base plate 109. The mounting plate 110 is provided on the left side of the base plate 109 and is mounted and fixed to the left end of the housing 101. A first hole is defined in the mounting plate 110 for the coupling shaft 112 to pass through. The motor 111, when operating, drives the coupling shaft 112, the base plate 109 and thus the water ripple light-transmitting tube 130 to rotate together.

A second hole is defined in the base plate 109 for the coupling shaft 112 to pass through. The coupling shaft 112 is provided with threads. After the coupling shaft 112 passes through the first hole and the second hole, the threads of the coupling shaft 112 pass through the base plate 109 to form a threaded connection with a nut 117, such that the coupling shaft 112 is fixedly connected to the base plate 109.

The water ripple lamp further includes a light-emitting assembly. The light-emitting assembly is at least partially provided inside a cavity defined by the water ripple light-transmitting tube 130. The light-emitting assembly includes: a heat dissipation column 107; at least one LED light source structure tightly attached or attached to the heat dissipation column 107; and a driver apparatus 108. The driver apparatus 108 is configured to be electrically connected to the LED light source structure.

The heat dissipation column 107 is fixedly connected to the right side cover 106, and at least partially extends into the cavity defined by the water ripple light-transmitting tube 130. For example, the heat dissipation column 107 is fixed to the right side cover 106 by welding or other means. The driver apparatus 108 is configured to drive or control a light-emitting operation of the at least one LED light source structure. The driver apparatus 108 may be provided within the right side cover 106 as illustrated. By at least partially extending the heat dissipation column 107 into the cavity defined by the water ripple light-transmitting tube 130, the water ripple light-transmitting tube 130 may rotate around the heat dissipation column 107 and the at least one LED light source structure. In this way, dynamic light and shadow effects may be produced.

Further, the LED light source structure may include a substrate 119 tightly attached or attached to the heat dissipation column 107 and at least one RGB lamp beads 120 provided on the substrate 119. The driver apparatus 108 may adjust the color temperatures, colors, and brightness of the RGB lamp beads 120, such that the RGB lamp beads 120 may emit monochromatic light or a variety of mixed-color light. In this way, the color of the emitted light is comprehensive, the emitted light effect is various and colorful, and the full color gamut of the emitted light is realized.

Alternatively, the heat dissipation column 107 may form a one-piece structure with the right side cover 106. The housing assembly including the left side cover 105, the housing 101, and the right side cover 106 may form a one-piece heat-dissipation structure. The heat generated by the LED light source structure may be promptly transferred to the heat dissipation column 107 and spread across the left side cover 105, the housing 101, and the right side cover 106 of the housing assembly, thereby greatly increasing the heat dissipation efficiency.

The water ripple lamp further includes a limiting assembly for limiting displacement and/or vibration of the water ripple light-transmitting tube assembly, and for supporting the water ripple light-transmitting tube assembly.

Specifically, the limiting assembly includes a retaining ring 114 and a plurality of bearing structures 115 mounted to the retaining ring 114. The retaining ring 114 is fixed to an inner side of the housing 101 on the right side of the housing 101 as illustrated. The retaining ring 114 includes an annular sheet structure. The bearing structure 115 is provided with a bearing 116 that abuts against an outer side of the outer ring 113. A rotational axis of the bearing 116 is parallel to a rotational axis of the water ripple light-transmitting tube 130, such that the bearing 116 is able to roll relative to the outer ring 113. When the water ripple light-transmitting tube 130 rotates, the bearing 116 rotates synchronously therewith. By abutting against the outer side of the outer ring 113, the bearing 116 may limit the outer ring 113, and thus may limit the displacement, vibration etc. of the water ripple light-transmitting tube 130, thereby enhancing moving stability and a service life of the water ripple light-transmitting tube assembly and the power assembly, and enhancing the stability of the light output from the water ripple lamp.

The water ripple lamp further includes an adjustable bracket 104. The adjustable bracket 104 is mounted to the lower end of the housing 101, and is configured to mount the water ripple lamp to the floor, the wall or other locations. A mounting angle of the adjustable bracket 104 is adjustable, so as to facilitate the adjustment of the projection direction of the water ripple lamp.

The water ripple lamp may further include a controller. The controller is electrically connected to any of the motor 111 and the driver apparatus 108 etc., so as to control operation of the motor 111 and/or the driver apparatus 108.

The water ripple lamp further includes a remote control 121. The controller may include a signal transceiver. The remote control 121 may remotely control the operation of the motor 111, the driver apparatus 108 through the signal transceiver.

The water ripple lamp may be powered by an external power source such as the utility grid, or by using a rechargeable battery or by replacing batteries. The rechargeable battery may be, for example, a rechargeable battery that is charged via, for example, a solar photovoltaic panel or a USB port.

Embodiment 2

The main difference between the present embodiment 2 and other embodiments is the power assembly. Other features of the embodiment 2 may be referred to the description in other embodiments.

In the present embodiment, the power assembly may include a motor, a gearing mechanism, and a coupling shaft. The motor is configured to provide prime power to the power assembly. The gearing mechanism is configured to be coupled to the motor by transmission manner, for adjusting an output revolving speed of the power assembly. The coupling shaft may be connected to the gearing mechanism in a transmission manner, so as to output power to the water ripple light-transmitting tube assembly of the water ripple lamp.

The motor and/or the gearing mechanism may be fixed to the housing assembly. For example, in the present embodiment 2, the mounting plate 111 in the above-mentioned embodiment 1 may be omitted. The motor and the gearing mechanism are instead fixedly connected to the housing or the left side cover of the housing assembly. In some embodiments, the motor and the gearing mechanism may be integrated into one single unit, and then the single unit is mounted to the housing assembly.

The coupling shaft may be connected to the base plate in a transmission manner. For example, similar to that in the above-mentioned embodiment 1, a second hole is defined in the base plate for the coupling shaft to pass through. The coupling shaft is provided with threads at one end. After the one end of the coupling shaft passes through the second hole, the threads of the coupling shaft pass through the base plate and forms a threaded connection with a nut. In this way, the coupling shaft and the base plate are fixedly connected together. Alternatively, a first gear may be fixedly connected to the base plate, a coupling shaft may be coaxially connected to a second gear, the first gear and the second gear are engaged in a transmission manner. Alternatively, the coupling shaft may also be connected to the base plate in a transmission manner through other means, which is not limited in the present disclosure.

Those skilled in the art should appreciate that, although in this and other embodiments, the power assembly is illustrated as being mounted on the left side of the water ripple lamp and the light-emitting assembly is illustrated as being mounted on the right side of the water ripple lamp. However, in the contrary, the power assembly may alternatively be mounted on the right side of the water ripple lamp, and the light-emitting assembly may correspondingly be mounted on the left side of the water ripple lamp, which is not limited in the present disclosure.

Embodiment 3

The main differences between the present embodiment 3 and other embodiments are the housing assembly and the first water ripple light-transmitting plate. Other features of the embodiment may be referred to the description in other embodiments.

In the present embodiment, alternatively, the housing assembly may include a housing, a left side cover and a right side cover. The left side cover is mounted at the left end of the housing. The right side cover is mounted at the right end of the housing. The housing may have a columnar shape, such as a cuboid, a quadratic column or a hexagonal column etc. The left side cover is mounted to an end of the housing, and the right side cover is mounted to another end of the housing. The housing, the right side cover and the left side cover collectively define an internal cavity, for accommodating or housing various components of the water ripple lamp.

Alternatively, the housing assembly may also omit at least one of the separated left side cover or the right side cover. Alternatively, the housing assembly may include two parts, namely an upper part and a lower part. The housing assembly may also be a one-piece structure. The present disclosure does not limit the specific manner in which the housing assembly is divided.

Alternatively, when various parts of the housing assembly are assembled, a heat-conducting medium may be added between any two contacting portions of the various parts, so as to enhance the heat transfer efficiency between the various portions. The housing assembly may include a heat-conducting portion. The heat-conducting portion may be made, for example, from metal, heat-conducting plastic, heat-conducting composite material, and the like. The heat-conducting portion may form a continuous heat dissipation path with the heat dissipation column. For example, the housing, the left side cover, and the right side cover of the housing assembly may each include a heat-conducting portion. After the housing assembly is assembled, these heat-conducting portions may be in contact with each other, and in contact with the heat dissipation column, thereby forming a continuous heat-conducting region from the heat dissipation column to the right side cover, and then to the housing and the left side cover. Alternatively, the housing assembly may be substantially made of a heat-conducting material such as metal.

For example, a heat-conducting medium may be provided between the housing and the left side cover by various means such as coating, sandwiching etc. A heat-conducting medium may be provided between the housing and the right side cover by various means such as coating, sandwiching etc. The heat-conducting medium includes, but is not limited to, a heat-conducting spacer, a heat-conducting paste etc.

Alternatively, the housing assembly defines one or more light outlets. For example, the housing assembly may define at least two light outlets that are spaced apart from each other. For example, at least two light outlets that are spaced apart from each other are defined on the housing of the housing assembly. The first water ripple light-transmitting plate covers the light outlet.

Alternatively, the light outlet has a circular shape. Alternatively, the first water ripple light-transmitting plate has a domed-shape or dome shape, and a bottom edge of the dome surrounds the light outlet and is fixed to the housing assembly. The shapes of the first water ripple light-transmitting plates facing the light outlets may be different from each other.

Accordingly, sets of LED light source structures may be provided on the heat dissipation column that correspond to the light outlets one-by-one. For example, a set including at least one LED light source structure may be provided on the heat dissipation column for each light outlet. The present disclosure does not limit the specific distribution and arrangement manner of the LED light source structures. Alternatively, the LED light source structure may be replaced by other kinds of light source structures. For example, a light source structure corresponding to one light outlet is an LED RGB light source structure or an LED RGB-W light source structure, and the light source structure corresponding to another light outlet is a laser.

In the present embodiment, by defining a plurality of light outlets and water ripple light-transmitting plate of different shapes, a diversity of the projection process may be increased.

Heat dissipation columns, retaining rings, motors, gearing mechanisms, base plates etc. similar to those mentioned in other embodiments may be fixed to the housing assembly in the present embodiment 3.

Embodiment 4

The main difference between the embodiment 4 and other embodiments is the limiting assembly. Other features of the embodiment may be referred to the description in other embodiments.

Specifically, the limiting assembly includes a retaining ring and one or more bearing structures mounted on the retaining ring. The retaining ring is fixedly connected to the housing assembly. The retaining ring includes an annular sheet structure. The annular sheet structure may surround the outer ring, and is spaced apart from the outer ring. A plurality of bearing structures are fixed to the annular sheet structure along the circumferential direction of the annular sheet structure. The bearing structure includes a rotating shaft and a bearing. The rotating shaft is fixed to the retaining ring. The bearing is configured to rotate around the rotating shaft. The bearing is configured to abut against an outer side of the outer ring.

Figure 7:
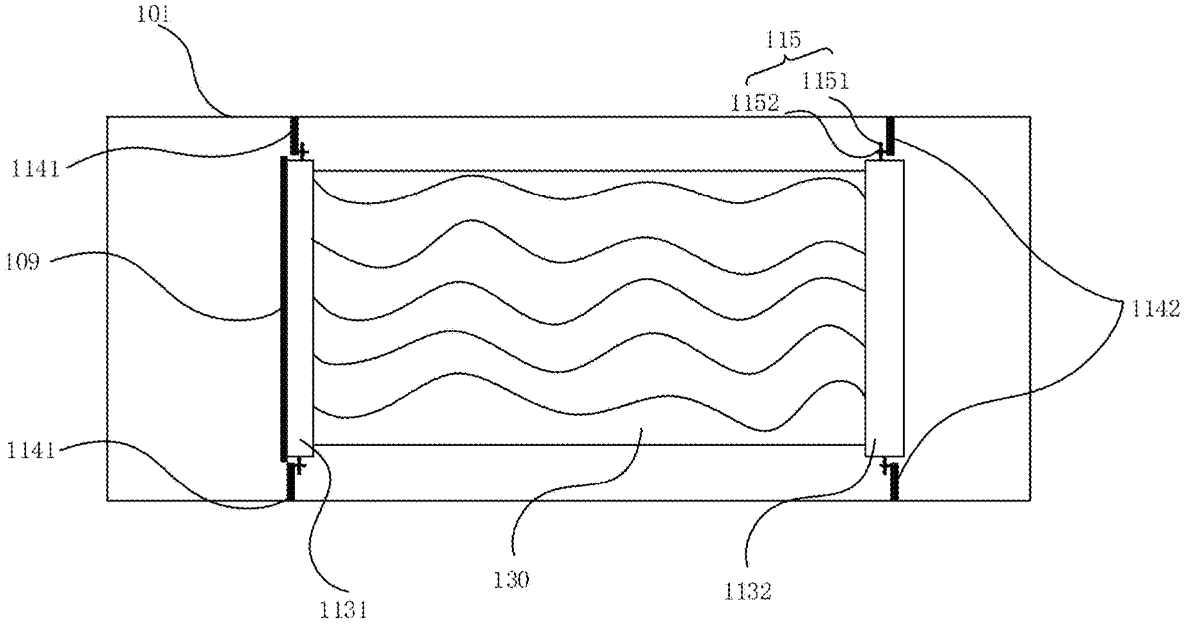
FIG. 7 is a side view of a water ripple light-transmitting tube assembly according to an embodiment of the present disclosure.

In the embodiment 1, the outer ring 113 is mounted and fixed at a right end of the water ripple light-transmitting tube 130. While in the present embodiment, referring to FIG. 7, FIG. 7 is a side view of the water ripple light-transmitting tube assembly according to an embodiment of the present disclosure. As illustrated in FIG. 7, the water ripple light-transmitting tube assembly may include a water ripple light-transmitting tube 130 and at least one outer ring 113. The at least one outer ring 113 may include a first outer ring 1131 and a second outer ring 1132 that are fixed at two opposite ends of the water ripple light-transmitting tube 130. The water ripple light-transmitting tube assembly may optionally further include a base plate 109. The base plate 109 is fixedly connected to one side of the first outer ring 1131 that is away from the water ripple light-transmitting tube 130.

Correspondingly, as illustrated in FIG. 7, the limiting assembly includes a first retaining ring 1141 and a second retaining ring 1142. The first retaining ring 1141 is configured to correspond or face the first outer ring 1131 1131, and the second retaining ring 1142 is configured to correspond or face the second outer ring 1132. Each of the first retaining ring 1141 and the second retaining ring 1142 is provided with one or more bearing structures 115. The bearing structure 115 is fixed to a corresponding one of the first retaining ring 1141 or the second retaining ring 1142. The bearing structure 115 further includes a bearing 1151. The bearing 1151 is configured to abut against a corresponding outer ring 113, and is rollable relative to the corresponding outer ring 113. Specifically, the bearing structure 115 includes a rotating shaft 1152 and a bearing 1151. The bearing 1151 is configured to rotate around the rotating shaft 1152. The rotating shaft 1152 is fixed to a corresponding one of the first retaining ring 1141 or the second retaining ring 1142. The bearing 1152 is configured to abut against a corresponding one of the first outer ring 1131 or the second outer ring 1132, and may be rollable relative the corresponding one of the first outer ring 1131 and the second outer ring 1132.

Figure 8:
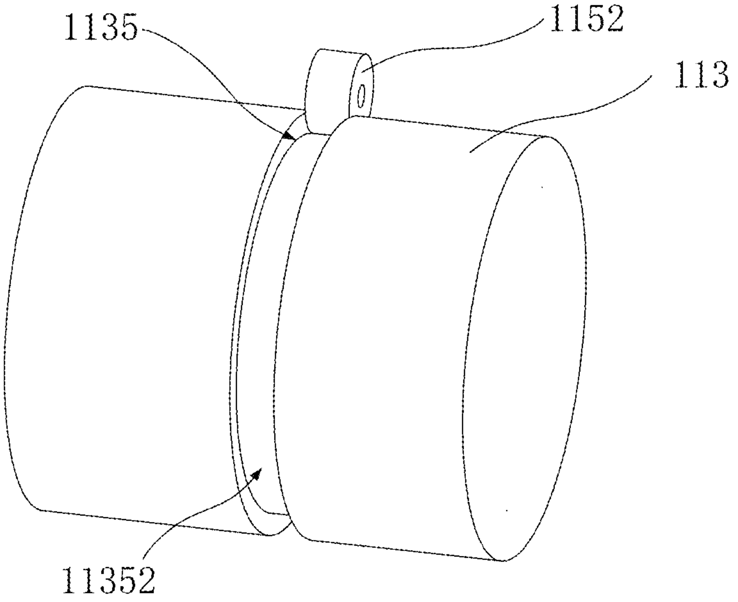
FIG. 8 is a schematic diagram illustrating an abutting arrangement between an outer ring and a bearing according to an embodiment of the present disclosure.

Alternatively, any of the above-mentioned outer rings 113, the first outer ring 1131 and the second outer ring 1132 may define a radially recessed annular raceway. As illustrated in FIG. 8, FIG. 8 is a schematic diagram illustrating an abutting arrangement between the outer ring 113 and the bearing 1152 according to the present disclosure. As illustrated in FIG. 8, the outer ring 113, which may also be referred to as the first outer ring 1131 or the second outer ring 1132, may define a radially recessed annular raceway 1135. The raceway 1135 may also be referred to as a channel or a groove. The raceway 1135 may include a bottom wall 11352. The cross-sectional shape of the raceway 1135 may be a rectangle shape, a tapered shape, a curved shape etc. Corresponding to the cross-sectional shape of the raceway 1135, the bottom wall 11352 may have a linear or flat, curved, etc. shape. The bearing 1152 is configured to abut against a bottom wall 11352 of the raceway 1135. In this way, sidewalls of the raceway 1135 may limit lateral relative movement between the bearing 1152 and the water ripple light-transmitting tube.

In the present embodiment 4, by providing the first outer ring 1131, the second outer ring 1132 and the corresponding limiting assembles, the force applied to or beard by the water ripple light-transmitting tube 130 may be more balanced, the rotation process would be more stable, and the stability of the light output by the water ripple lamp may be further increased. Further, by adding raceways 1135 that match with the bearings 1152, the axial movement of the water ripple light-transmitting tube 130 may be further limited, thereby increasing the operational stability of the water ripple lamp.

Embodiment 5

Figure 9:
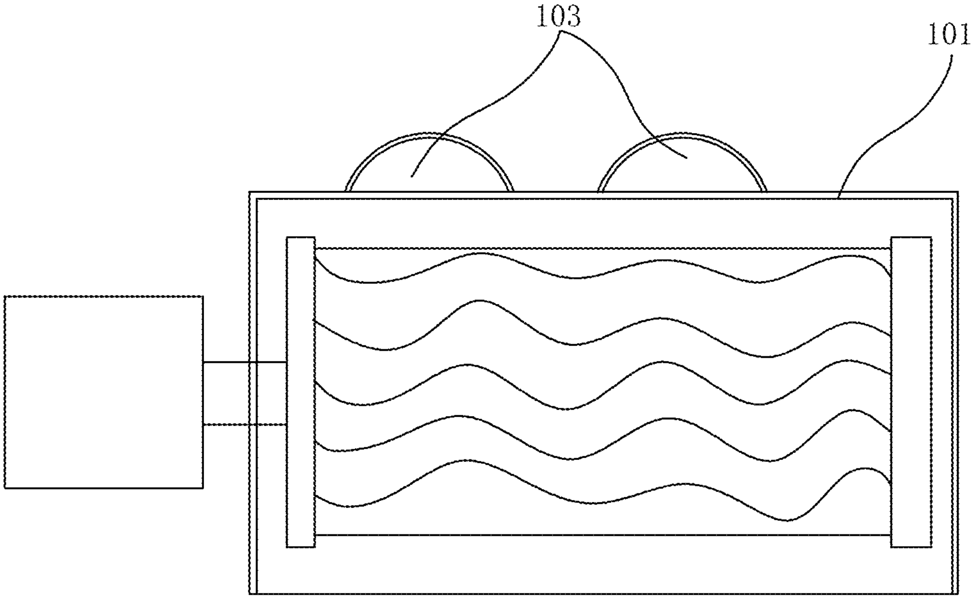
FIG. 9 is a schematic diagram of a water ripple lamp according to an embodiment of the present disclosure.
Figure 10:
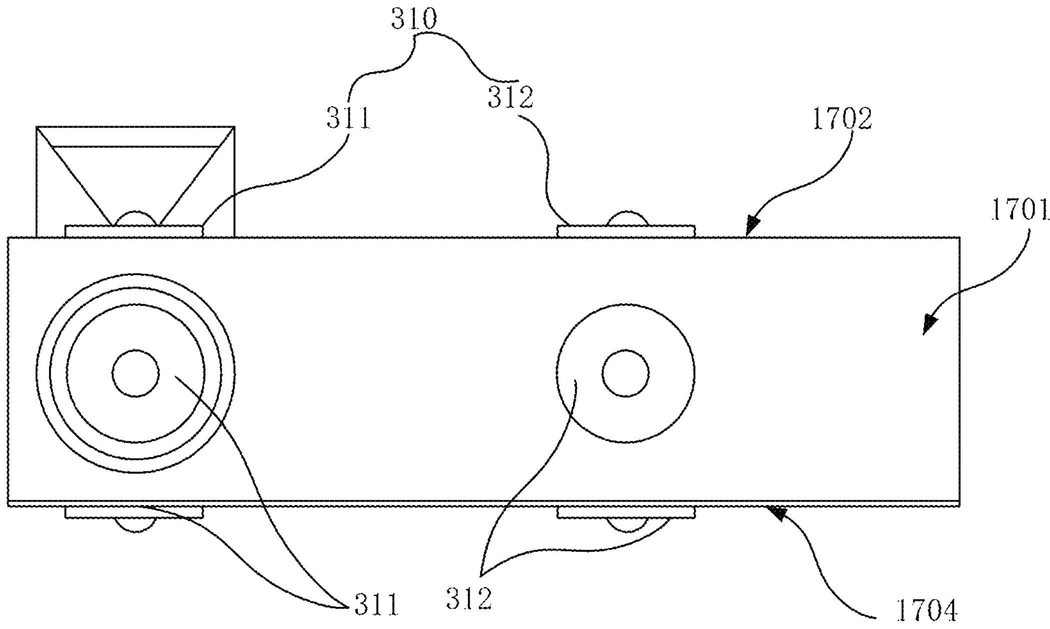
FIG. 10 is a schematic diagram illustrating a water ripple light-transmitting tube and a light-emitting assembly of the water ripple lamp of FIG. 9.
Figure 11:
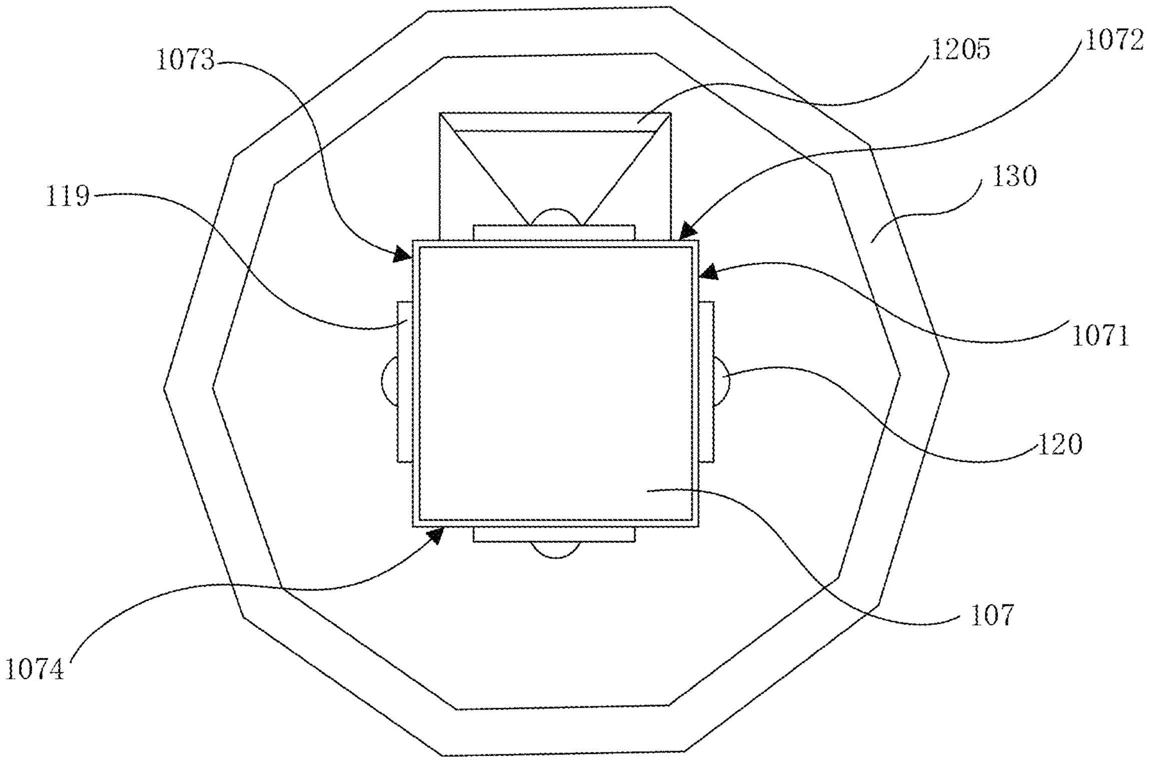
FIG. 11 is a schematic diagram of a light-emitting assembly of the water ripple lamp of FIG. 9.

As illustrated in FIGS. 9-11, FIG. 9 is a schematic diagram of a water ripple lamp according to an embodiment of the present disclosure, FIG. 10 is a schematic diagram illustrating a water ripple light-transmitting tube and a light-emitting assembly of the water ripple lamp of FIG. 9, and FIG. 11 is a schematic diagram of a light-emitting assembly of the water ripple lamp of FIG. 9.

As illustrated in FIG. 11, the light-emitting assembly includes a heat dissipation column 107 and at least one light source structure tightly attached to the heat dissipation column 107. The at least one light source structure is tightly attached to each of the plurality of side faces as illustrated in the figures. The light-emitting assembly further includes the driver apparatus 108 as illustrated in the accompanying drawings of other embodiments.

The heat dissipation column 107 may have a substantially prismatic shape, and includes a plurality of side faces. The cross section of the prism may be circular, triangle, square, rectangle and the like, which is not limited in the present disclosure. The specific shape of the prism may be determined as per the concrete number and layout manner of the light sources that needed.

The heat dissipation column 107 as illustrated in FIG. 11 is a cuboid, with a square cross section. In this way, the heat dissipation column 107 may include four side faces. In a counterclockwise direction, these four side faces are a first side face 1071, a second side face 1072, a third side face 1073 and a fourth side face 1074 respectively. In accordance with practical needs, the heat dissipation column 107 may include more or fewer side faces, which is not limited in the present disclosure.

As illustrated in FIG. 11, each side face of the heat dissipation column 107 may include one or more light source structures. The number of light source structures arranged on each side face may vary.

The light source structure includes a substrate 119 tightly attached to the heat dissipation column 107 and one or more lamp beads 120 provided on the substrate 119. By way of exemplification only but not limitation, the substrate 119 may be an aluminum substrate or an aluminum alloy substrate or other types of metal or metal alloy substrate. The lamp bead 120 may for example be an LED lamp bead, such as an LED RGB lamp bead, or an LED RGB-W lamp bead etc.

As illustrated in FIG. 11, any of the one or more light source structures may include a lens 1205. The lens 1205 is configured to cover the lamp bead of the corresponding light source structure. The lens 1205 may refract, reflect, and/or block light of the lamp bead, to further enrich patterns of the light finally projected out by the water ripple lamp.

As further illustrated in FIG. 10, the light source structure 310 on the side face 1072 or any other side face may include a first light source structure 311 and a second light source structure 312. The first light source structure 311 may include a lens 1205, while the second light source structure 312 may not include a lens 1205. The lens 1205 may be chosen to be provided or not provided for each light source structure according to practical needs, which is not limited in the present disclosure. In addition, the first light source structure 311 and/or the second light source structure 321 on each side face may each include one or more light sources and a substrate. The one or more light sources may for example be a lamp bead. The lamp bead is provided on the substrate. The present disclosure does not limit the structure of the first light source structure 311 and/or the second light source structure 321.

As illustrated in FIG. 9, the two first water ripple light-transmitting plates 103 may be provided on the housing 101. Each of the two first water ripple light-transmitting plates 103 may cover a corresponding light outlet. The housing 101 may be substantially opaque. Any of the two first water ripple light-transmitting plates 103 may be an arc-shaped or a dome-shaped water ripple light-transmitting plate. The sizes and/or the shapes of the two first water ripple light-transmitting plates 103 may be same or different, which is not limited in the present disclosure. The two first water ripple light-transmitting plates 103 and the corresponding two light outlets may be provided on a same side of the water ripple lamp, such as at the top side, the bottom side or other side of the water ripple lamp. In FIG. 10, the first light source structure 311 may emit light towards one (for example, the left) first water ripple light-transmitting plate 103, the second light source structure 312 may emit light towards another one (for example, the right) first water ripple light-transmitting plate 103. In this way, the patterns projected out through different first water ripple light-transmitting plate 103 may be independently controlled, thereby forming a richer combination of light and shadow.

Alternatively, the heat dissipation column 107 as illustrated in FIG. 10 may be configured to be axially rotatable, so as to control or switch an emitting direction of a selected side face or a selected light source structure on the heat dissipation column 107. The emitting direction may for example be a direction towards the first water ripple light-transmitting plate 103. Such rotation of the heat dissipation column 107 may be realized by any means, such as by a manual actuation of a user, an electrical actuation, etc.

Figure 12:
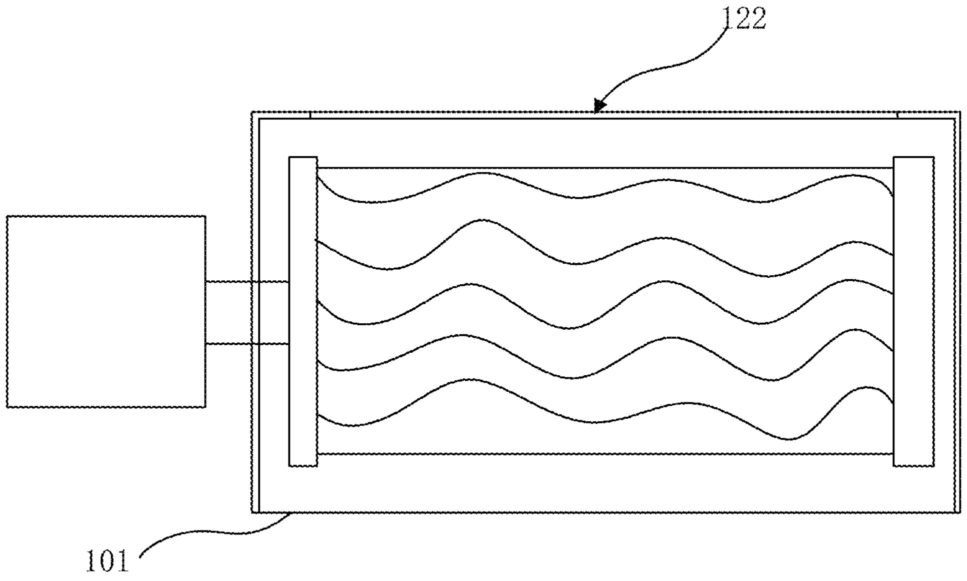
FIG. 12 is a schematic diagram of a water ripple lamp according to an embodiment of the present disclosure.
Figure 13:
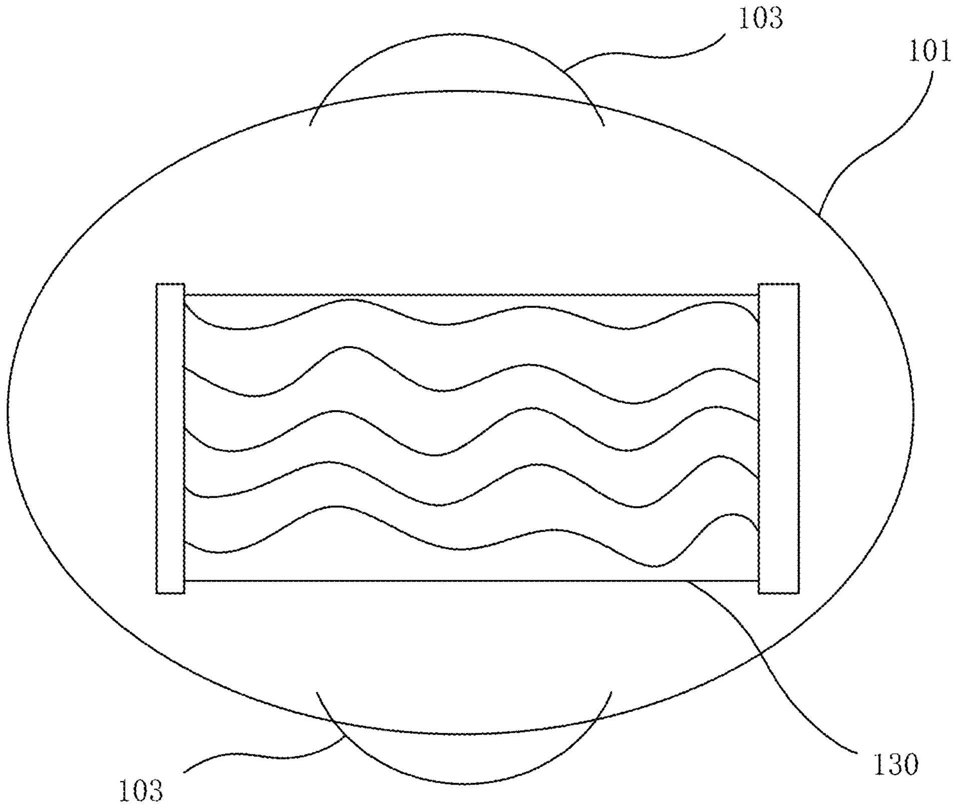
FIG. 13 is a schematic diagram of a water ripple lamp according to an embodiment of the present disclosure.

As illustrated in FIGS. 12 and 13, FIG. 12 is a schematic diagram illustrating a case in which the first water ripple light-transmitting plate 103 is not provided, FIG. 13 is a schematic diagram illustrating a case in which the first water ripple light-transmitting plate 103 is arranged in a different manner.

As illustrated in FIG. 12, the water ripple lamp may not include the above-mentioned light outlet 102 and the first water ripple light-transmitting plate 103. Instead, the housing 101 may be at least partially light-transmitting. The housing 101 may further include a water ripple pattern.

For example, the housing 101 as a whole or at least a portion thereof is configured as a light transmission zone 122. The light transmission zone 122 may include water ripple pattern. The light transmission zone 122 may for example be a prismatic light transmission zone. Alternatively, the entire side face of the housing 101 of FIG. 12 may be a light transmission zone 122 with the water ripple pattern.

As illustrated in FIG. 13, the water ripple lamp may include a housing assembly. The housing 101 of the housing assembly may for example be a spherical housing, an ellipsoidal housing or a housing with an arc surface. The housing 101 may also be a prismatic housing, the shape of the housing 101 is not limited in the present disclosure. The housing 101 may be substantially opaque. The housing 101 at least defines at least one light outlet 102 at one of two opposite ends. The two opposite ends are, for example, an upper side and a lower side. Each first water ripple light-transmitting plate 103 is configured to cover at least one light outlet 102. The first water ripple light-transmitting plate 103 is for example an arc-shaped or dome-shaped water ripple sheet. The bottom edge of the first water ripple light-transmitting plate 103 may extend into the housing 101. The water ripple lamp may include more light outlets and correspondingly more first water ripple light-transmitting plates 103, which is not limited in the present disclosure.

The water ripple light-transmitting tube assembly including the water ripple light-transmitting tube 130, and the power assembly, the limiting assembly, and the light-emitting assembly etc. as described above may be accommodated in the housing assembly in a manner described in other embodiments.

As illustrated in FIG. 14, FIG. 14 illustrates an arranging manner of the power assembly, the limiting assembly and the light-emitting assembly. As illustrated in FIG. 14, the motor 111 of the power assembly is fixedly connected to an end of the housing 101. The motor 111 is connected to the water ripple light-transmitting tube assembly through the coupling shaft 112, so as to drive the water ripple light-transmitting tube assembly to rotate.

The limiting assembly includes a retaining ring 114 and a plurality of bearing structures 115 mounted to the retaining ring 114. The retaining ring 114 is fixed to an inner side of the housing 101 as illustrated in FIG. 14. The bearing structure 115 is provided with a bearing 116 that abuts against an outer side of the outer ring 113. When the water ripple light-transmitting tube 130 rotates, the bearing 116 rotates synchronously therewith. By abutting against an outer side of the outer ring 113, the bearing 116 may limit the outer ring 113, and thus may limit the displacement, vibration etc. of the water ripple light-transmitting tube 130, thereby enhancing the moving stability and service life of the water ripple light-transmitting tube assembly and the power assembly, and enhancing the stability of the light output from the water ripple lamp.

The light-emitting assembly includes: a heat dissipation column 107; at least one LED light source structure tightly attached to the heat dissipation column 107; and a driver apparatus 108. The driver apparatus 108 is configured to be electrically connected to the LED light source structure. The driver apparatus 108 is illustrated in the FIG. 14 by dashed line. The driver apparatus 108 may be embodied as a circuitry, a chip, or an integrated circuit etc. As illustrated in FIG. 14, the heat dissipation column 107 is fixed to the housing 101 at one end of the housing 101, such as the end opposite the power assembly. The heat dissipation column 107 at least partially extends into the cavity defined by the water ripple light-transmitting tube 130, the part of the heat dissipation column 107 inside the cavity is illustrated in dashed lines in FIG. 14. The heat dissipation column 107 is polyhedral, and includes a plurality of side faces. The at least one LED light source structure provided on one side face may emit light towards one water ripple light-transmitting plate 103. The at least one LED light source structure provided on another side face may emit light towards another water ripple light-transmitting plate 103.

By means of the arrangement such as that of FIG. 12 and/or FIG. 13, the water ripple lamp of the present disclosure may achieve a greater projection range. For example, the water ripple lamp of FIG. 12 may achieve a 360° projection range in the circumferential direction. By providing different light source structures on different side faces of the heat dissipation column 107, the present disclosure may project different patterns in different projection directions, further enriching the projection effect.

Embodiment 6

Figure 16:
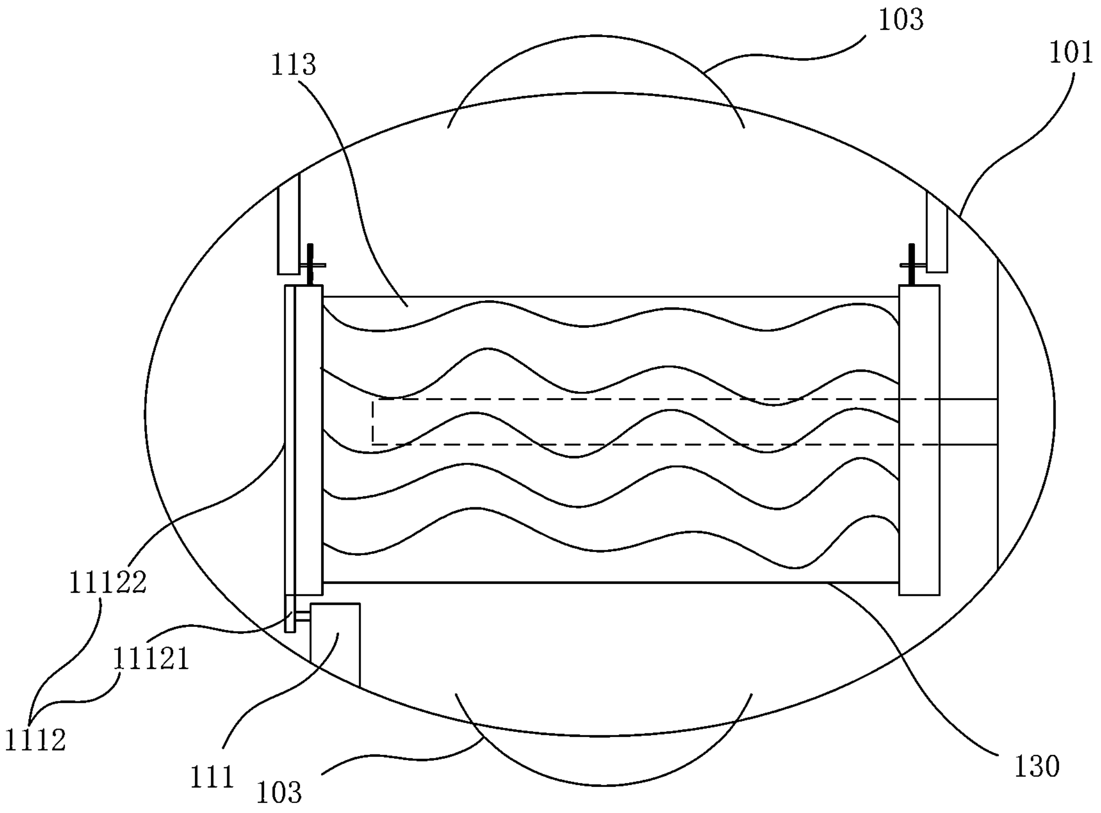
FIG. 16 is a schematic diagram of a water ripple lamp according to an embodiment of the present disclosure.

As illustrated in FIG. 15 and FIG. 16, FIG. 15 and FIG. 16 illustrates the water ripple lamp according to other embodiments of the present disclosure respectively. In comparison with the water ripple lamp embodiment of FIG. 14, the arrangement manner of the power assembly in the embodiments of FIG. 15 and FIG. 16 are different.

As illustrated in FIG. 15 or FIG. 16, the power assembly may include the motor 111 and a gear pair 1112 connected to each other in a transmission manner. The motor 111 is fixedly connected to a lower part of the housing 101, lower than the water ripple light-transmitting tube assembly. The gear pair 1112 includes a first gear member 11121 and a second gear member 11122 that mesh with each other. Specifically, the first gear member 11121 is connected to the motor 111 in a transmission manner. The second gear member 11122 is fixedly connected to one side of the water ripple light-transmitting tube assembly, and is configured to rotate together with the water ripple light-transmitting tube assembly. The present disclosure does not limit the specific type of the gear pair 1112, as well as the first gear member 11121 and the second gear member 11122, as long as they are capable of realizing the transmission requirements of the present disclosure.

As illustrated in FIG. 15, the gear pair 1112 may be a worm-gear transmission pair, in which the first gear member 11121 is a worm and the second gear member 11122 is a worm wheel. The gear pair 1112 may also be a bevel-gear transmission pair, in which the first gear member 11121 and the second gear member 11122 are all bevel gears that mesh with each other.

As illustrated in FIG. 16, the gear pair 1112 may be a spur-gear transmission pair, in which the first gear member 11121 and the second gear member 11122 are all spur gears that mesh with each other. The gear pair 1112 may also be a helical-gear transmission pair, in which the first gear member 11121 and the second gear member 11122 are all helical gears that mesh with each other.

By arranging the motor 111 of the power assembly below the water ripple light-transmitting tube assembly, the space within the housing 101 may be fully utilized. Further as illustrated in FIG. 15 and FIG. 16, the motor 111 may be arranged at the lower side of the water ripple light-transmitting tube 130, the limiting assembly may be arranged at the upper side of the water ripple light-transmitting tube 130. In this way, structural support is provided for the water ripple light-transmitting tube 130 from two opposite sides respectively, thereby enhancing the stability of the water ripple light-transmitting tube 130.

The above are only implementations of the present disclosure, and do not limit the patent scope of the present disclosure. Any equivalent changes to the structure made by the description and drawings of this application or directly or indirectly used in other related technical field are included in the protection scope of this application.

What is claimed is:

1. A water ripple lamp, comprising:
a housing assembly, defining two light outlets opposite to each other;
a first water ripple light-transmitting plate, covering the light outlets;
a water ripple light-transmitting tube assembly, arranged inside the housing assembly and configured to be rotatable, wherein the water ripple light-transmitting tube assembly comprises:
a water ripple light-transmitting tube; and
an outer ring, fixed to an end of the water ripple light-transmitting tube; and
a limiting assembly, comprising:
a retaining ring, fixed to an inner side of the housing assembly;
a bearing structure, fixed to the retaining ring and comprising a bearing,
wherein the bearing is configured to abut against the outer ring from a radially outer side of the outer ring, and is rollable relative to the outer ring,
a light-emitting assembly, comprising:
a heat dissipation column, comprising a plurality of side faces, fixedly connected to the housing assembly and at least partially extending into a cavity defined by the water ripple light-transmitting tube; and
at least one light source structure, tightly attached to each of the plurality of side faces,
wherein the at least one light source structure attached to one of the plurality of side faces faces one of the two light outlets, and the at least one light source structure attached to another of the plurality of side faces faces another of the two light outlets.

2. The water ripple lamp as claimed in claim 1, wherein the outer ring defines a radially recessed annular raceway, and the bearing is configured to abut against a bottom wall of the raceway,
wherein a rotational axis of the bearing is parallel to a rotational axis of the water ripple light-transmitting tube.

3. The water ripple lamp as claimed in claim 1, wherein the outer ring comprises a first outer ring and a second outer ring, the first outer ring is fixedly provided at a first end of the water ripple light-transmitting tube, the second outer ring is fixedly provided at a second end of the water ripple light-transmitting tube, and
the retaining ring comprises a first retaining ring and a second retaining ring, the first retaining ring is configured to face the first outer ring, and the second retaining ring is configured to face the second outer ring.

4. The water ripple lamp as claimed in claim 1, wherein the light source structure comprises a substrate and at least one LED lamp bead, the substrate is tightly attached to the heat dissipation column, and the at least one LED lamp bead is disposed on the substrate.

5. The water ripple lamp as claimed in claim 1, wherein the housing assembly comprises continuous heat-conducting portion in contact with the heat dissipation column.

6. The water ripple lamp as claimed in claim 1, wherein the housing assembly further defines at least two light outlets spaced apart from each other, and
the first water ripple light-transmitting plate comprises a dome-shaped water ripple light-transmitting plate, and the dome-shaped water ripple light-transmitting plate is configured to cover at least one of the at least two spaced-apart light outlets.

7. The water ripple lamp as claimed in claim 1, further comprising:
a power assembly, configured to drive the water ripple light-transmitting tube assembly to rotate,
the water ripple light-transmitting tube assembly comprises a base plate, the base plate is fixed to an end of the water ripple light-transmitting tube, and
the power assembly comprises a motor and a coupling shaft connected in a transmission manner, the coupling shaft is connected to the base plate in a transmission manner.

8. The water ripple lamp as claimed in claim 1, further comprising:
a power assembly, configured to drive the water ripple light-transmitting tube assembly to rotate,
the power assembly comprises a motor and a gear pair connected to each other in a transmission manner, the gear pair comprises a first gear member and a second gear member that mesh with each other, the first gear member is connected to the motor in a transmission manner, the second gear member is fixed to one side of the water ripple light-transmitting tube assembly,
the motor is arranged below the water ripple light-transmitting tube assembly.

9. The water ripple lamp as claimed in claim 1, further comprising:
an adjustable bracket, mounted to the housing assembly.

10. A water ripple lamp, comprising:
a housing assembly, comprising a housing, the housing defining two light outlets opposite to each other;
a water ripple light-transmitting tube assembly, arranged inside the housing assembly and is configured to be rotatable,
a light-emitting assembly, comprises:
a heat dissipation column, comprising a plurality of side faces, fixedly connected to the housing assembly and at least partially extending into a cavity defined by the water ripple light-transmitting tube assembly; and
at least one light source structure tightly attached to one of the plurality of side faces,
wherein the at least one light source structure attached to one of the plurality of side faces faces one of the two light outlets, and the at least one light source structure attached to another of the plurality of side faces faces another of the two light outlets.

11. The water ripple lamp as claimed in claim 10, wherein each of the at least one light source structure comprises a substrate and at least one lamp bead, the substrate is tightly attached to one of the plurality of side faces, the at least one light source structure is provided on the substrate.

12. The water ripple lamp as claimed in claim 11, wherein one of the at least one light source structure further comprises a lens, the lens is configured to cover the at least one lamp bead.

13. The water ripple lamp as claimed in claim 10, wherein the heat dissipation column is configured to be axially rotatable, and switches an emitting direction of the at least one light source structure.

14. The water ripple lamp as claimed in claim 10, wherein the housing assembly comprises a housing that is at least partially light-transmissive, the housing comprises a water ripple pattern.

15. The water ripple lamp as claimed in claim 10, wherein the water ripple lamp comprises two first water ripple light-transmitting plates, one of the two first water ripple light-transmitting plates is configured to cover one of the two light outlets, another one of the two first water ripple light-transmitting plates is configured to cover another one of the two light outlets.

16. The water ripple lamp as claimed in claim 15, wherein the housing further defines two light outlets on a same side of the housing, the at least one light source structure that is tightly attached to each of the plurality of side faces comprises a first light source structure and a second light source structure, the first light source structure is configured to emit light towards one of the two light outlets on the same side of the housing, and the second light source structure is configured to emit light towards another one of the two light outlets on the same side of the housing.

17. The water ripple lamp as claimed in claim 10, further comprising:

a power assembly, configured to drive the water ripple light-transmitting tube assembly to rotate, the power assembly comprises a motor and a gear pair connected to each other in a transmission manner, the gear pair comprises a first gear member and a second gear member that mesh with each other, the first gear member is connected to the motor in a transmission manner, the second gear member is fixed to one side of the water ripple light-transmitting tube assembly, the motor is arranged below the water ripple light-transmitting tube assembly.

* * * * *